July 21, 1953 — E. S. GEARY ET AL — 2,645,958
FIXTURE FOR SKINNING INSULATION FROM ELECTRICAL CONDUCTORS
Filed Nov. 5, 1949 — 4 Sheets-Sheet 1
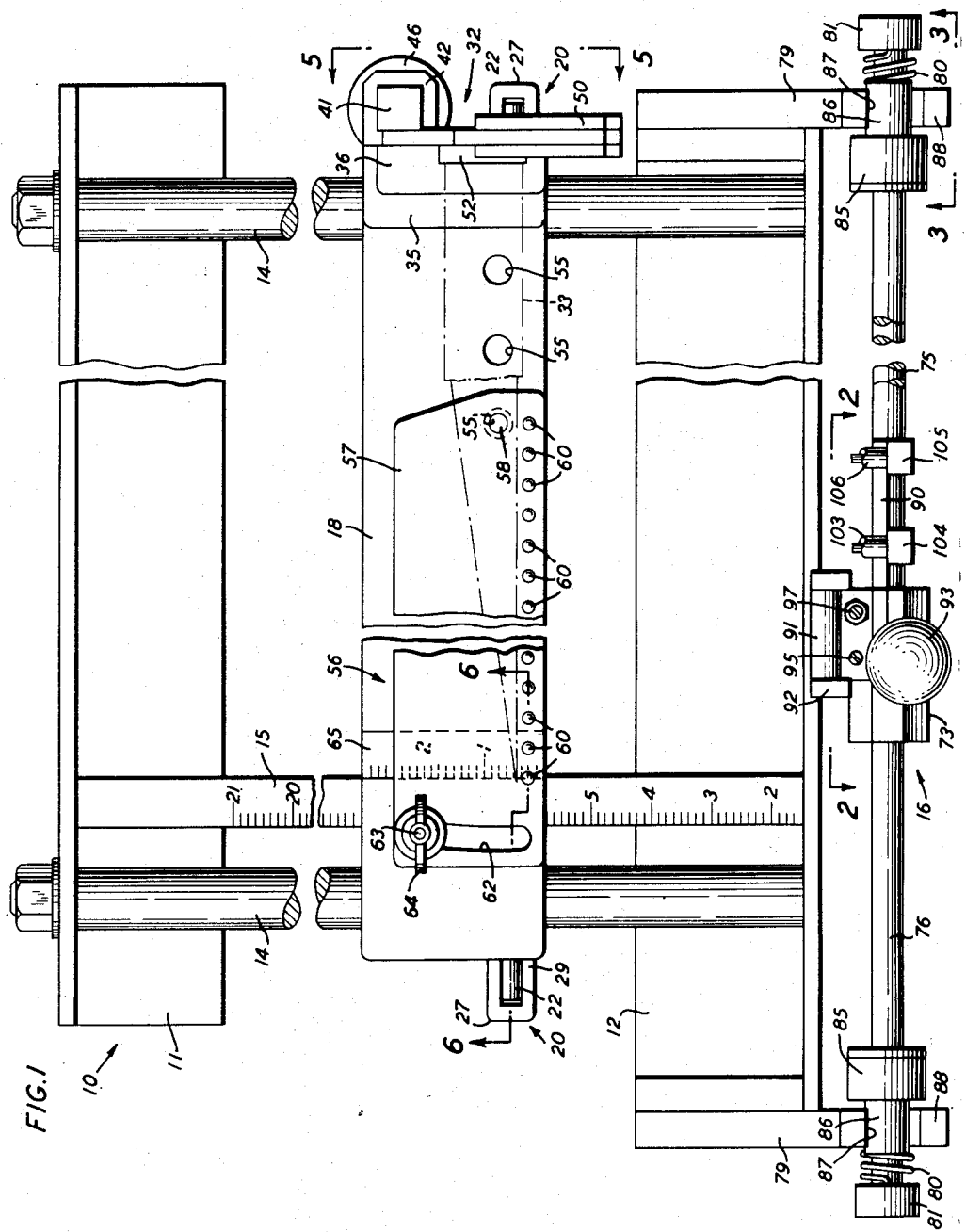
INVENTORS
E. S. GEARY
G. W. SODERMAN
BY W. C. Parnell
ATTORNEY

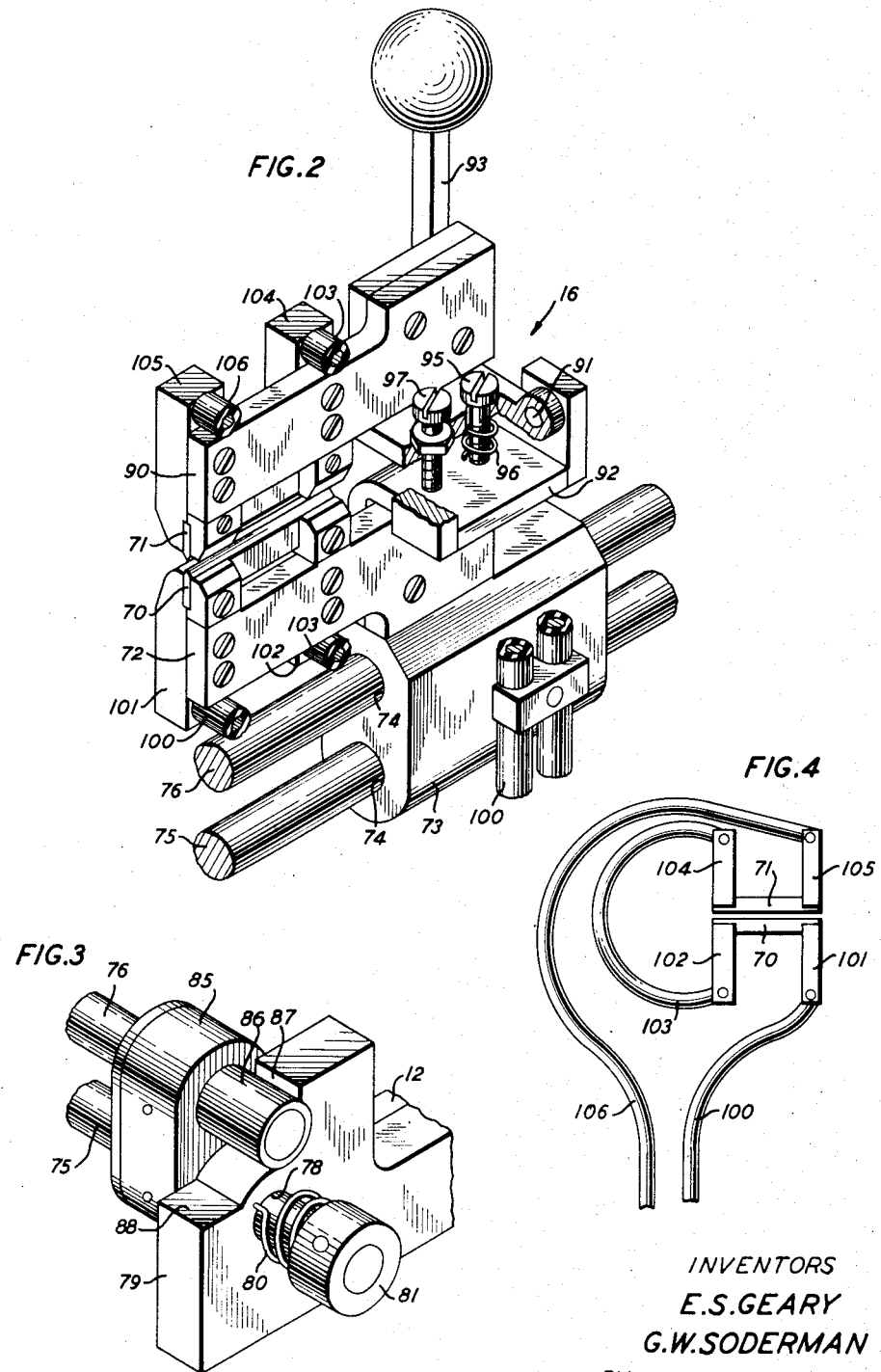

July 21, 1953 E. S. GEARY ET AL 2,645,958
FIXTURE FOR SKINNING INSULATION FROM ELECTRICAL CONDUCTORS
Filed Nov. 5, 1949 4 Sheets-Sheet 3
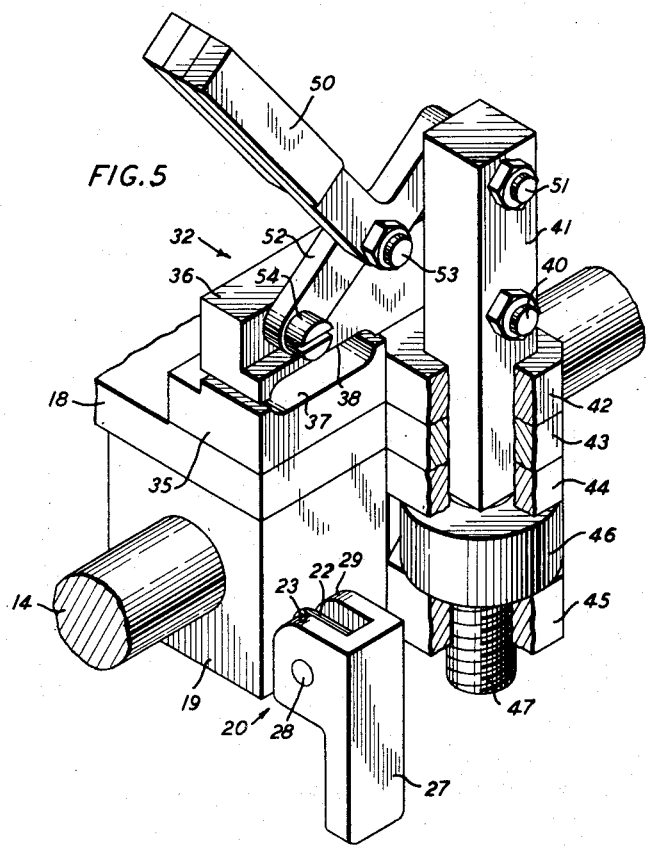
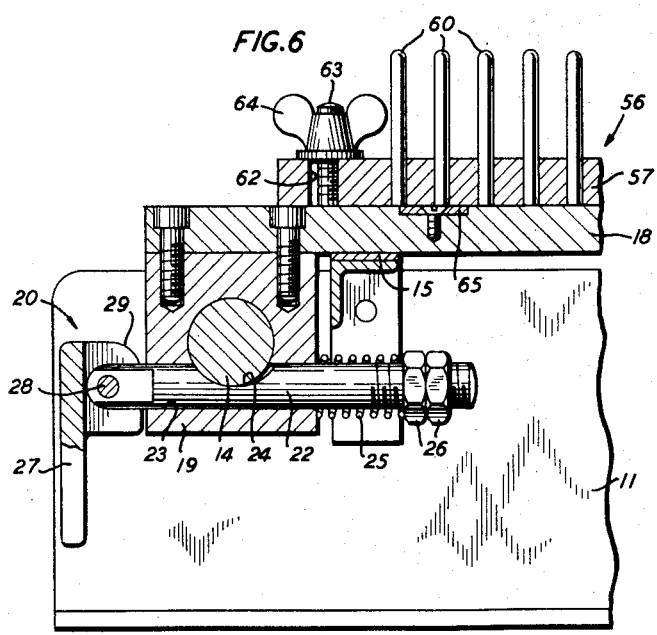
INVENTORS
E.S.GEARY
G.W.SODERMAN
BY
ATTORNEY July 21, 1953 E. S. GEARY ET AL 2,645,958
FIXTURE FOR SKINNING INSULATION FROM ELECTRICAL CONDUCTORS
Filed Nov. 5, 1949 4 Sheets-Sheet 4

INVENTORS
E.S.GEARY
G.W.SODERMAN
BY
ATTORNEY

Patented July 21, 1953

2,645,958

UNITED STATES PATENT OFFICE 2,645,958

FIXTURE FOR SKINNING INSULATION FROM ELECTRICAL CONDUCTORS

Edward S. Geary, Nutley, and George W. Soderman, West Englewood, N. J., assignors to Western Electric Company, Incorporated, New York, N. Y., a corporation of New York Application November 5, 1949, Serial No. 125,774

2 Claims. (Cl. 81—9.51)

This invention relates to skinning fixtures for skinning insulation from electrical conductors and has for its object, the provision of a fixture for forming ends of electrical conductor cables and skinning the insulation from measured lengths of their conductors.

In processing switchboard cables, the conductor ends are to be formed so that their groups of conductors may occupy a minimum of space, while their leading ends are disposed in selected groups spaced in accordance with the spacing of the terminals to which they are to be connected. In addition to the accurate formation of the conductor ends of the cables, it is important that the leading ends of the conductor wires be of measured lengths.

With the aforementioned objects in view, the invention comprises a skinning fixture having a holder for a conductor and a skinning unit movable relative to the holder to skin the insulation from the conductor.

More specifically, the fixture includes a carriage supported for movement measured distances from the skinning unit and supporting a clamp to firmly clamp a cable. A cam is pivotally mounted on the carriage for movement into different positions to vary the formation of the conductor end of the cable, pins of the comb functioning to uniformly space groups of the conductors given distances apart. The carriage is mounted on parallel bars of a main frame and locking means is provided to firmly lock the carriage in any selected position relative to the skinning unit. The skinning unit is composed of electrically heated blades normally urged away from each other to enable the feeding of the insulated conductors therebetween. Through the actuation of a hand lever, the heating elements are closed on the conductors to burn the insulation at the starting portions. Continued movement of the hand lever will move the heating elements relative to the conductors to skin the insulation therefrom.

Other objects and advantages will be apparent from the following detailed description when considered in conjunction with the accompanying drawings, wherein Fig. 1 is a fragmentary top plan view of the skinning fixture showing the comb in one position;

Fig. 2 is an enlarged fragmentary isometric view of the skinning unit taken substantially along the line 2—2 of Fig. 1;

Fig. 3 is an enlarged fragmentary isometric view taken substantially along the line 3—3 of Fig. 1;

Fig. 4 is a schematic front elevational view of the skinning elements and the electrical conductors connected thereto, to include them in an electrical circuit;

Fig. 5 is a fragmentary isometric view of the cable clamp on the carriage taken substantially along the line 5—5 of Fig. 1;

Fig. 6 is an enlarged fragmentary sectional view taken along the line 6—6 of Fig. 1;

Figure 7:
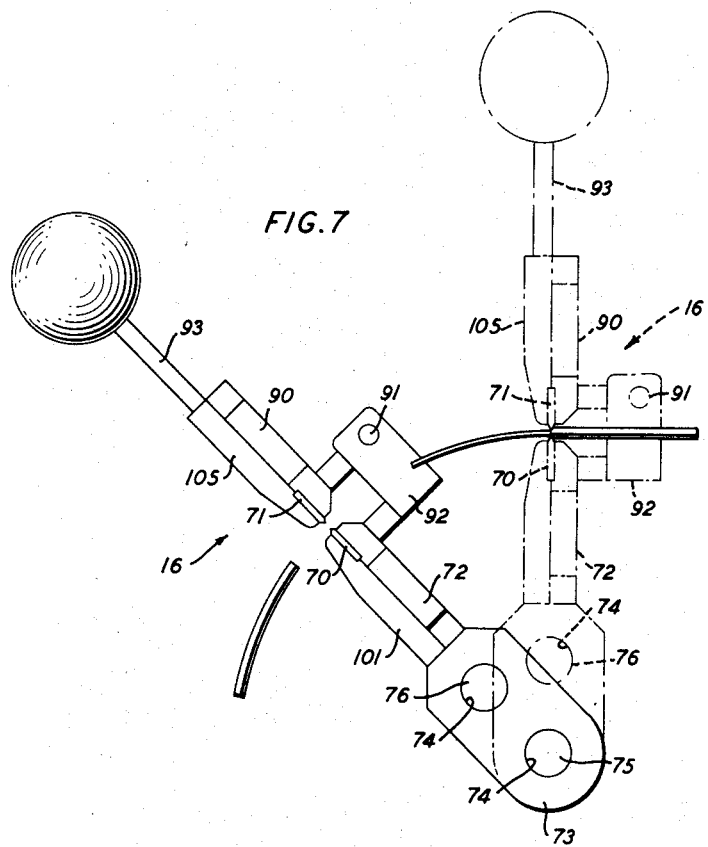
Fig. 7 is an end elevational view of the skinning unit shown in broken lines at the beginning of the skinning operation and in solid lines at the end of its skinning operation.

Referring now to the drawings, attention is first directed to Fig. 1 which illustrates a main frame 10 having members 11 and 12 connected together by parallel rods 14 and a scale 15, the scale being divided into inches from the plane of the normal position of the skinning elements of the skinning unit indicated generally at 16.

A carriage 18 has apertured members 19, Figs. 5 and 6, adjacent the ends thereof mounted for sliding movement on the bars 14 whereby the carriage may be moved measured distances relative to the skinning unit 16. Latches indicated generally at 20 are provided for each of the apertured members 19 to grip their respective rods 14 and thereby lock the carriage in any desired adjusted position. The latches are identical in structure, one of the latches being shown in detail in Fig. 6. This latch includes an element 22 slidably disposed in an aperture 23 of its member 19 and provided with a concaved recess 24 through which a portion of the rod 14 extends. The element 22 is normally urged to the right by a spring 25 which applies sufficient force to cause the element to act as a wedge to firmly lock the member 19 to the rod 14, this force being variable through the adjustment of nuts 26. A lever 27 pivotally connected at 28 to the element 22 has a cam surface 29 to engage the adjacent surface of the member 19 to move the element 22 into a position to free the carriage for movement. The element may be latched into this position by the actuation of both latches 20 whereby the carriage may be free to move on the rods 14.

A cable clamp indicated generally at 32 shown in detail in Fig. 5 is mounted at one end of the carriage to firmly clamp the end of the cable 33. The clamp includes a stationary jaw 35 fixedly mounted on the carriage 18 and a movable jaw 36, these jaws having recesses 37 and 38 respectively cooperating to clamp the cable 33. One end of the jaw 36 is pivoted at 40, this pivot being supported by a vertical member 41 held in apertured members 42 and 43 of the stationary jaw 35 and the carriage 18 respectively. Apertured projections 44 and 45 of the adjacent apertured member 19 receive the vertical member 21 and are spaced from each other to support a hand wheel 46 and maintain it in a given position. The hand wheel is mounted on a threaded end 47 of the vertical member 41 and through this means, the movable jaw 36 may be adjusted relative to the stationary jaw 35 for variations in the contours of the cables to be clamped thereby. The movable jaw 36 is actuated into and out of clamping position by a hand lever 50 pivotally connected at 51 to the vertical member 41 and connected through a link 52 to the movable jaw 36. This connection is such that if the center pivot 53 is beyond a dead center with the pivot 51 and a lower pivot 54, the movable jaw 36 will be locked into clamping position.

Figure 8:
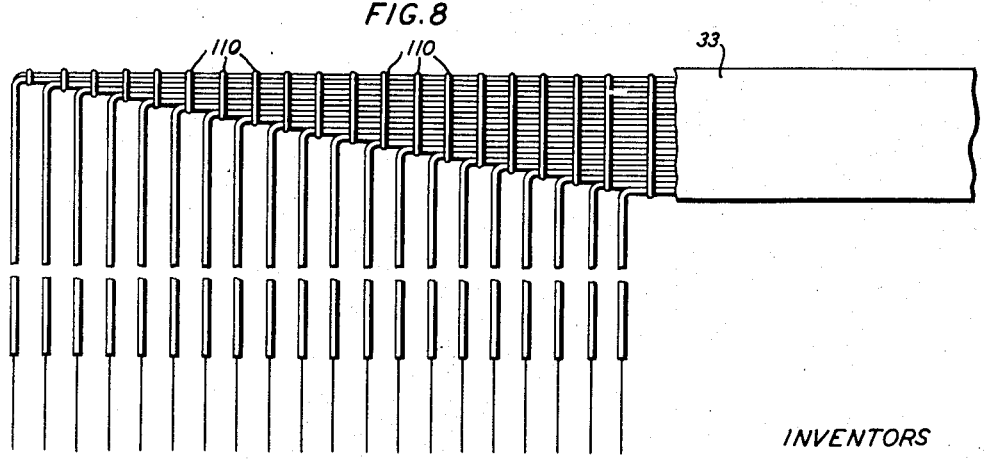
Fig. 8 is a top plan view of a formed and skinned cable end resulting from the position of the comb in its extreme opposite position from that shown in Fig. 1.

The carriage 18 is provided with a plurality of spaced apertures 55 to receive combs of different sizes. The comb 56 shown in the present embodiment of the invention includes a platelike body member 57 carrying a pivot pin 58 near one end thereof to be received in its respective aperture 55, the body being movable about the axis of the pin into different positions to form different types of end structures for the cables. A series of equally spaced pins 60 have their lower ends mounted in apertures in the body 57 in alignment, as shown in Fig. 1, to receive selected groups of conductors from the cable 33. An elongated arcuate aperture 62 is formed in the outer end of the body 57 to receive a screw 63 mounted on the carriage 18 and provided with a wing nut 64 to lock the comb in any selected position about the axis of its pin 58. The carriage 18 is also provided with a scale 65 cooperating with the scale 15 to accurately measure the leading ends of the conductors from the pins of the comb, particularly when the comb has been moved clockwise from the position shown in Fig. 1 to form a cable end structure as shown in Fig. 8.

The skinning unit 16 (Fig. 1) is shown more in detail in Figs. 2, 3, 4 and 7. This unit includes relatively movable skinning blades 70 and 71 having knife-like edges disposed parallel with each other. The skinning blade 70 is mounted in a holder 72, the holder being mounted on a support 73 which is provided with longitudinally extending parallel apertures 74 to receive supporting rods 75 and 76. The supporting rod 75 extends through apertures 78 of vertical members 79 secured to the frame member 12 whereby the rod 75 acts as a pivotal support for the skinning unit 16. Helical springs 80, interposed between the vertical members 79 and collars 81, fixed to the ends of the rod 75 and secured to these respective members, normally urge the rod 75 in a direction to return the unit 16 to and hold it in its normal position.

The rod 76 is maintained at a given position with respect to the rod 75 by extending through the support 73 and through double collars 85 mounted short of the ends of the rods as shown in Fig. 1. The ends of the rod 76 are provided with sleeves 86 for engagement with vertical surfaces 87 and horizontal surfaces 88, of the vertical members 79, which act as stops for the skinning unit 16.

The skinning blade 71 is carried by a support 90 pivotally supported at 91 on a bracket 92 secured to the main support 73 whereby the blade 71 may be moved relative to the blade 70. This movement is brought about through the aid of a hand lever 93 fixedly mounted on the support 90. A screw 95 carried by the bracket 91 limits the position of the blade 71 away from the blade 70. A spring 96 normally urges the support 90, with the blade 71, the limit of their movement away from the blade 70. An adjustable screw 97 carried by the support 90 and positioned to engage the bracket 92 functions to vary the distance the stripping element 71 may be moved toward the stripping element 70. This variation is necessary to perform accurate stripping of the insulation from the electrical conductor, the variation depending upon the gage or diameter of the conductor wire, enabling the stripping elements to cut or burn through the insulation without damaging the wire.

The stripping elements 70 and 71 are electrically heated by being included in an electrical circuit through the aid of the lead wires and connections shown in Figs. 2 and 4. Referring to Fig. 4, it will be noted that a lead wire 100 extends to a terminal 101 electrically connected to one end of the stripping element 70, a terminal 102 at the other end of the stripping element 70 being connected to a lead wire 103, which has its other end connected to a terminal 104 at one end of the stripping element 71. A terminal 105 connected at the other end of the stripping element 71 is connected to the other line 106 of the main circuit which, when closed, will cause a current to flow through line 100, terminal 101, stripping element 70, terminal 102, line 103, terminal 104, stripping element 71, terminal 105 and line 106.

Considering now the operation of the skinning fixture, let it be assumed that the fixture is in readiness to receive a cable of a given size and that the sheath has been removed for a given distance at one end of the cable. The cable 33 is placed on the clamping jaw 35 in the recess 37 (Fig. 5) while the clamping unit 32 is in its open position, after which the lever 50 is actuated to close the clamping unit to firmly clamp the cable on the carriage. The carriage at this time may be free to move on its rods 14. Its location with respect to the skinning unit 16 is determined depending upon the length of the leads extending from the comb or the formed portion of the cable. The carriage 18 may then be locked in place by moving the latch members 27 from their horizontal releasing positions to their downwardly extending locking positions shown in Figs. 5 and 6. Furthermore, it will be determined what size comb is necessary for the cable being formed and the position it is to assume. With the comb illustrated in Fig. 1 in the position there shown, groups of the electrical conductors selected according to their color codes may be extended about their respective pins 60, after which the group of conductors extending from the pins to the sheath portion of the cable may be tied as illustrated at 110 in Fig. 8.

The fixture is now ready for the skinning operation. The skinning unit 16 is moved to one end or the other of the fixture on its supporting rods 75 and 76 to receive the ends of the conductors in selected groups, perform one skinning operation and then be moved on to the next group of conductors. The skinning unit, other than being moved longitudinally on its rods from one skinning operation to another is normally held in position to receive the conductors. In other words, the unit is held vertically in its normal position by the combined forces of the springs 80 and the stripping blades are spaced apart by the spring 96. The selected group of conductors may be positioned between the strip blades 70 and 71 after which the operator, gripping the handle 93 may move it counterclockwise (Fig. 7) to first move the blade 71 toward the blade 70, a distance limited by the stop 97, causing the blades to burn the insulation at a measured position from the comb. Further movement of the lever 93 causes the unit 16 to move from the broken line position (Fig. 7) to the solid line position shown in this figure, limited by the sleeves 96 on the ends of the rod 76 engaging the stop surface 88. During this action of the unit, the insulation is skinned from the conductors. The skinning unit 16 is allowed to return to its normal position and is moved longitudinally of its supporting rods 75 and 76 to receive the next group of insulated conductors. The skinning operation is repeated step by step until all of the leading ends of the insulated conductors have their insulation removed.

In forming the cable structure as shown in Fig. 8, the comb 56 is rotated about its pivot pin 58, the distance allowed by aperture 62, after which it is locked in position by the wing nut 64. These different cable end formations provide triangular-like conductor structures which may be disposed closely adjacent each other with groups of wires connected to like terminals or like electrical units and consuming the minimum amount of space.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A skinning fixture comprising means to hold a plurality of insulated conductors at spaced substantially parallel positions, a carriage having an aperture therein, a shaft extending through the aperture to support the carriage for rocking movement about the axis of the shaft and moved axially thereof relative to the insulated conductors, companion elements heated to burn portions of the insulation from selected groups of the conductors, means on the carriage to support one of the elements, a pivoted support on the carriage for the other element, and an actuator connected to the pivoted support, and through the pivoted support to the carriage, and movable in a continuous path to first close the elements on a selected group of the conductors to cause them to burn insulation along the lines of contact therewith and then move them with the carriage about the axis of the shaft to cause the elements to burn given lengths of insulation from the selected group of conductors.

2. A skinning fixture comprising means to hold a plurality of insulated conductors at spaced substantially parallel positions, a carriage having an aperture therein, a shaft extending through the aperture to support the carriage for rocking movement about the axis of the shaft and moved axially thereof relative to the insulated conductors, companion elements heated to burn portions of the insulation from selected groups of the conductors, means on the carriage to support one of the elements, a pivoted support on the carriage for the other element, means to limit and vary the relative positions of the elements when moved into their closed positions, and an actuator connected to the pivoted support, and through the pivoted support to the carriage, and movable in a continuous path to first close the elements on a selected group of the conductors to cause them to burn insulation along the lines of contact therewith and then move them with the carriage about the axis of the shaft to cause the elements to burn given lengths of insulation from the selected group of conductors.

EDWARD S. GEARY.
GEORGE W. SODERMAN.

References Cited in the file of this patent

UNITED STATES PATENTS

| Number | Name | Date |
|---|---|---|
| 1,509,044 | Kuchmuk | Sept. 16, 1924 |
| 1,666,277 | White | Apr. 17, 1928 |
| 1,733,294 | Cross | Oct. 29, 1929 |
| 1,734,745 | Ray | Nov. 5, 1929 |
| 2,192,056 | Watts | Feb. 27, 1940 |
| 2,465,537 | Isaacson et al. | Mar. 29, 1949 |

FOREIGN PATENTS

| Number | Country | Date |
|---|---|---|
| 144,966 | Switzerland | Apr. 16, 1931 |